(12) United States Patent
Hagersten

(10) Patent No.: US 11,023,376 B2
(45) Date of Patent: Jun. 1, 2021

(54) SYSTEM AND METHODS FOR EFFICIENT VIRTUALLY-TAGGED CACHE IMPLEMENTATION

(71) Applicant: Samsung Electronics Co., Ltd., Suwon-si (KR)

(72) Inventor: Erik Ernst Hagersten, Uppsala (SE)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 113 days.

(21) Appl. No.: 16/196,086

(22) Filed: Nov. 20, 2018

(65) Prior Publication Data
US 2019/0155733 A1    May 23, 2019

Related U.S. Application Data

(60) Provisional application No. 62/588,720, filed on Nov. 20, 2017.

(51) Int. Cl.
*G06F 12/0895* (2016.01)
*G06F 12/0811* (2016.01)
(Continued)

(52) U.S. Cl.
CPC ...... *G06F 12/0806* (2013.01); *G06F 12/0811* (2013.01); *G06F 12/0895* (2013.01);
(Continued)

(58) Field of Classification Search
CPC .......... G06F 12/08; G06F 12/128; G06F 2212/6042; G06F 12/0806; G06F 12/0811;
(Continued)

(56) References Cited

U.S. PATENT DOCUMENTS 1,021,009 A * 3/1912 Olorode et al. ............ B03B 5/00
                                                       209/155
8,195,890 B1 * 6/2012 James .................. G06F 12/0824
                                                       711/141
(Continued)

FOREIGN PATENT DOCUMENTS

WO    WO-2017/077502 A1    5/2017

OTHER PUBLICATIONS

European Search Report for European Patent Application No. 18207242.1 dated Apr. 5, 2019.
(Continued)

*Primary Examiner* — Christopher B Shin
(74) *Attorney, Agent, or Firm* — Harness, Dickey & Pierce, P.L.C.

(57) ABSTRACT

A multiprocessor system includes a plurality of nodes and at least one memory, each node containing at least one processor; a first cache configured to store a plurality of first cache lines, the first cache being private to at least one node from among the plurality of nodes; and a second cache configured to store a plurality of second cache lines, the second cache being at a higher level than the first cache, wherein at least one of the first cache lines includes a first associated pointer pointing to a location of one of the second cache lines, and wherein at least one of the second cache lines includes a second associated pointer pointing to a location of one of the first cache lines.

18 Claims, 8 Drawing Sheets

(51) Int. Cl.
  *G06F 12/1045* (2016.01)
  *G06F 12/0806* (2016.01)
  *G06F 12/126* (2016.01)
  *G06F 12/128* (2016.01)

(52) U.S. Cl.
  CPC ........ *G06F 12/1054* (2013.01); *G06F 12/126* (2013.01); *G06F 12/128* (2013.01); *G06F 2212/62* (2013.01)

(58) Field of Classification Search
  CPC ............. G06F 12/0895; G06F 12/1054; G06F 12/126; G06F 2212/62
  USPC ......................................................... 711/119
  See application file for complete search history.

(56) References Cited

U.S. PATENT DOCUMENTS

| | | | | |
|---|---|---|---|---|
| 8,656,083 | B2* | 2/2014 | Kern | G06F 12/0246 711/103 |
| 9,229,866 | B2* | 1/2016 | Kannan | G06F 12/0842 |
| 9,323,774 | B2* | 4/2016 | Dally | G06F 16/1744 |
| 9,535,700 | B2* | 1/2017 | Nystad | G06F 9/3851 |
| 2005/0102473 | A1* | 5/2005 | Sakata | G06F 12/1054 711/122 |
| 2012/0137075 | A1* | 5/2012 | Vorbach | G06F 12/0842 711/122 |
| 2014/0156947 | A1* | 6/2014 | Avudaiyappan | G06F 12/0895 711/138 |
| 2014/0189238 | A1* | 7/2014 | Zei | G06F 12/1063 711/119 |
| 2014/0289469 | A1* | 9/2014 | Ishii | G06F 12/084 711/119 |
| 2015/0032964 | A1* | 1/2015 | Habermann | G06F 12/0848 711/122 |
| 2015/0347297 | A1 | 12/2015 | Hagersten et al. | |
| 2016/0179700 | A1 | 6/2016 | Venkatasubramanian et al. | |
| 2018/0329819 | A1* | 11/2018 | Hagersten | G06F 12/0833 |
| 2020/0133861 | A1* | 4/2020 | Avudaiyappan | G06F 12/0811 |

OTHER PUBLICATIONS

Office Action for Corresponding Korean Patent Application No. 10-2018-0141959 dated Mar. 20, 2020.

* cited by examiner

SYSTEM AND METHODS FOR EFFICIENT VIRTUALLY-TAGGED CACHE IMPLEMENTATION

This non-provisional application claims priority under 35 U.S.C. § 119 to U.S. Provisional Application No. 62/588,720, filed on Nov. 20, 2017, in the U.S. Patent and Trademark Office, the disclosure of which is incorporated herein in its entirety by reference.

BACKGROUND

1. Field

At least some example embodiments of the inventive concepts relate, generally, to methods and systems for accessing data in computer memory devices and, more particularly, to mechanisms and techniques for implementing a coherent cache hierarchy.

2. Description of Related Art

Today's processors are often equipped with caches that can store copies of the data and instructions stored in some high-capacity memory. A popular example today of such high-capacity memory is dynamic random access memory (DRAM). Herein, the term "memory" will be used to collectively refer to all existing and future memory implementations. Cache memories, or "caches" for short, are typically built from much smaller and much faster memory than other memory implementations and can subsequently only hold copies of a fraction of the data stored in main memories or secondary storage devices at any given time. Today, caches are often implemented using SRAM and large caches can be implemented using DRAM. The caches described herein can be implemented using any existing and future memory technology.

Often, the memory system of a computer system includes a range of caches, with larger and slower caches (here referred to as higher-level caches) close to the main memory and smaller and faster caches (here referred to as lower-level caches) closer to the processor. This configuration is typically referred to as a cache hierarchy, memory hierarchy or memory system. Each level in the cache hierarchy is referred to as a cache level. FIG. 1 is a block diagram illustrating a portion of a computer system. In the example illustrated in FIG. 1, the computer system is a multi-processor system, where each CPU 101 is assigned its own first-level private cache 102 (L1 cache). More detailed examples of the CPU 101 and the L1 cache 102 are described below with reference to FIG. 2. A private cache is a cache where space for a data unit can only be in response to an activity of a CPU local to the cache (or a CPU in the same node as the cache, where the cache is private to that node). In this example, the second-level cache 103 is shared by all the CPUs 101 and may contain data and instructions that are accessed by all of the CPUs 101. Cache 103 is a global cache, since space for a data unit can be made in response to activities of any CPU 101. Furthermore, cache 103 is a shared cache, since each data unit can only exist in one shared copy (while each private cache can have its own replicated copy). Memory 105 also stores instructions and data that are accessed by all CPUs 101. The (main) memory 105 is typically accessed using a physical address, or PA for short, while the addresses generated by a CPU 101 are typically virtual addresses. Computer systems with several CPUs and several private caches, such as the system shown in FIG. 1, need efficient mechanisms for finding a requested data unit in one of the caches as well as for keeping the multiple copies of a datum stored in different nodes coherent.

Such computer systems will also typically include one or more secondary storage devices in addition to main memory and cache memory. These secondary storage devices can include one or more of hard drives, optical drives, flash drives or the like, which are collectively represented here by disk 104. The disk or secondary storage 104 may store several orders of magnitude more data than the memory 105, but is not directly accessible using a physical address. If a CPU 101 wants to access data stored on the disk 104, a virtual memory system (not shown in FIG. 1) moves a chunk of data, typically referred to as a page, from the disk 104 to the memory 105 and creates a translation from virtual addresses corresponding to that page to physical addresses. A special kind of translation cache (not shown in FIG. 1), typically called a "translation look-aside buffer" or TLB for short, caches the translation mappings from virtual pages to physical pages. The virtual memory system can be viewed as a caching system, which stores a portion of the data located in the disk 104 in the memory 105.

FIG. 2 is a block diagram for explaining an example cache hierarchy of a computer system. FIG. 2 shows a more detailed view of the cache organization from FIG. 1, where the CPU 101 is shown to contain several cache-like structures, such as the Instruction TLB (ITLB, 201) and Data TLB (DTLDB, 205), and a CPU core 202. The level 1 cache 102 is shown as including an instruction cache 200 and a data cache 206, interposed between the CPU 101 and the level 2 (and potentially higher level) caches 207. FIG. 2 also shows a high-capacity memory 208 connected to the cache hierarchy. Though, the computer system in FIG. 2 is illustrated as a uni-processor (i.e., one-processor) system, the computer system in FIG. 2 may be a portion of a multi-processor system.

When a CPU 101 requests data that is present in the cache, referred to as a cache hit, that request can be serviced much faster than an access to data that is not present in the cache, referred to as a cache miss. Typically, an application running on the CPU 101 that experiences fewer cache misses will execute more quickly and consume less energy than if the same application which suffers from more cache misses, assuming that the two versions of the application otherwise have similar properties. Therefore, considerable effort has been invested in techniques for avoiding cache misses, and also to design implementations that can make cache hits and cache misses efficient with respect to both their access latency and the energy that these memory transactions consume.

In order to understand how to develop solutions to this cache hit/miss problem, some understanding of cache organization and terminology will be useful. Typically, data are installed into caches in fixed chunks that are larger than the word size of a processor, known as cache lines. Common cache line sizes today are, for example, 32, 64 and 128 bytes, but as will be appreciated by those skilled in the art both larger and smaller cache line sizes exist for various cache implementations. The cache line size may also be variable for some cache implementations.

A common way to organize the data placement in memory 208 is in a manner that each data word is statically mapped to reside in one specific cache line. Each cache typically has an index function that identifies a portion of the cache where each cache line can reside, known as a set. The set may contain space to hold one or more cache lines at the same time. The number of cache lines which the set can hold is referred to as its associativity. Often, the associativity for all of the sets in a cache is the same. Such caches are often referred to as set-associative caches. The associativity may also vary between the sets. Each of the spaces in a set that can hold a cache line is referred to as a way.

In order to determine the identity of each cache line stored in each set, cache lines in a cache each have some identifier associated with them. One common example of such an identifier is an address tag. When looking for a specific cache line in a cache, its address may be used to determine the set of the cache where it may reside. The address tags of the cache lines of the corresponding set are compared to a tag portion of the address used to identify a cache line (see, e.g., TAG and ATAG depicted in FIG. 3 and described below) to determine if the desired cache line resides in the cache, and if so, in which way it resides, i.e., in which of the spaces in a set that can hold a cache line it resides.

Often, each cache has built-in strategies to determine which cache line to keep in the set and which cache line to evict (also referred to as replace) to make space for a new cache line being brought into the set, referred to as its replacement policy. The replaced cache line is known as a victim or a replaced cache line. Popular replacement policies used in conjunction with cache memories include, but are not limited to, least-recently used (LRU), pseudo-LRU and random replacement policies.

Inclusive cache hierarchies require that a copy of a block of data (for example a cache line) present in one cache level, for example a block of data in the L1 cache, also exists in the higher cache levels (here, higher refers to cache levels with higher numbers than 1), for example in the L2 and L3 cache. Exclusive cache hierarchies only have one copy of the block of data (for example a cache line) existing in the entire cache hierarchy, while non-inclusive hierarchies can have a mixture of both strategies. In exclusive and non-inclusive cache hierarchies, it is common that a cache line is installed in the next higher cache level upon eviction from a given cache level.

With this background on caches and cache lines in mind, this discussion now proceeds to illustrate one conventional technique for identifying specific cache locations within a cache hierarchy like that shown in FIGS. 1 and 2. FIG. 3 is a block diagram for explaining a conventional implementation of a two-level cache hierarchy including a set-associative caches and a set-associative data translation look-aside buffer (TLB). FIG. 3 shows an example of the organization of a computer system node containing a CPU 301, a DTLB 303, an L1 CACHE 307 and an L2 CACHE 311. The CPU 301 generates a memory request containing a virtual address 302 (VADDR), which is used to perform an associative lookup in the DTLB 303. The virtual address 302 is in this example divided into three parts: P_OFFSET (page offset, for example consisting of the low-level bits), TAG and INDEX. The INDEX portion of the virtual address 302 is used to identify the set within the DTLB 303 where the address translation may be stored.

The illustrated DTLB 303 used in this example has a two-way associative organization, showing two entries of the identified set. Each entry consists of an address tag (ATAG) 304, and physical page frame (PPF) 305. The TAG portion of the virtual address 302 is compared with the ATAGs 304 of each entry of the identified set. The logic 318 determines if there is match for any of the entries, and, if so, controls the MUX 306 to select the corresponding PPF 305. A physical address PADDR 316 is composed by concatenating the PPF 305 selected by MUX 306 with the P_OFFSET portion of the virtual address 302. Alternatively, if neither of the entries of the identified set match the TAG portion of the virtual address 302, then a TLB fill operation is performed and the needed translation entry is brought into the DTLB 303.

The PADDR 316 is used to perform a lookup in the L1 CACHE 307. More specifically, an INDEX portion of the PADDR 316 is used to identify the set where the cache line containing the requested data may be stored. (It should be noted that this L1 INDEX may contain different bits than the DTLB INDEX). The depicted L1 CACHE 307 has a 2-way associative organization with two entries in the identified set. Each entry consists of an address tag (ATAG) 308, and data 309 of the corresponding cache line. A TAG portion of the PADDR 316 is compared with the ATAGs of each entry of the identified set. The logic 319 determines if there is match for any of the entries, and controls the MUX 310 to select the corresponding data. If neither of the entries matches (depicted by L1 MISS 317) a lookup in the L2 CACHE 311 is needed. While the division of PADDR 316 into INDEX and TAG portions for the L2 CACHE lookup may differ from the division done for the L1 CACHE lookup, the remaining steps for the L2 CACHE lookup are typically similar to those performed for the lookup in the L1 CACHE. If a miss in the L2 CACHE is determined, new lookups in higher-level caches or accesses to memory may be needed. It can be noted that if the INDEX portion of PADDR 316 used by the L1 cache is entirely composed by P_OFFSET bits, the access to the L1 cache 307 can be started before the PPF information coming from the MUX 306 is available. This is often referred to as a virtually indexed, physically tagged cache (VIPT).

It would be appreciated by someone skilled in the art that several "nodes", each with a memory hierarchy similar to the one depicted in FIG. 3, can be connected together to form a coherent multiprocessor system. Another example of a multiprocessor is shown in FIG. 1, where each CPU has its own private L1 cache. This further complicates the task of locating where a requested data resides since it is no longer sufficient to always search for the data in the next higher cache level. Mechanisms for searching caches of the other nodes as well as for keeping the multiple copies of a datum stored in different nodes coherent are needed. Typically, a global cache coherence protocol will be implemented to keep the data values of each cache line coherent. Such a protocol will send coherence messages (sometimes referred to as coherence requests) to the different caches. For example, the L1 caches of FIG. 1 and FIG. 2 may receive read requests or invalidation requests from the coherence protocol. Such coherence requests typically carry a physical address used to identify the requested cache line.

FIG. 5 is a block diagram illustrating three options for implementing a cache. FIG. 5 illustrates three cache implementation options at a high level. The functionality for finding the data in the L1 cache 307 is described by the physically indexed, physically tagged (PIPT) cache 500. A portion of the virtual address VA 502 is used to perform a lookup in TLB 503 to get the physical page frame (PPF), which is used in part to form the INDEX 504 used to access L1 cache 505. Some other parts of the PPF are compared with the physical address tags PAT of the set in L1 cache 505 identified by the INDEX function 504 (a 2-way associative cache shown). The outcome of the comparison is used to choose the DATA associated with the virtual address (VA) 502 accessed by the CPU core 501.

VIPT cache 510 can provide a faster access time to the data associated with the virtual address 512 generated by the CPU core since it only uses virtual address bits to form its INDEX 514. The lookup in TLB 513, used to find the corresponding physical page frame PPF can be performed in parallel with reading out the two physical address tags (PAT) from the indexed set in L1 cache 515. That way associated with the virtual address 512 can be accessed faster than in the PIPT cache 500, since the TLB access is performed in parallel with the PAT lookups. In order for VIPT cache 510 to be practical, there is often a size restriction imposed upon such caches. The combination of cache size and its associativity must be such that none of bits of the index 514 should be translated when the virtual address 512 is translated to a physical address by the TLB 513. For example, if the computer system has a page size of 4 Kbyte, the bits used for the index function can only be the lower 12 bits of a virtual address.

The topmost cache 520 shown in FIG. 5 is a virtually indexed virtually tagged (VIVT) cache. The topmost cache 520 only uses bits of virtual address 522 for its INDEX bits 524 as well as for the address bits 523 to compare with the indexed address tags of L1 cache 525. Subsequently, the address tags stored in the L1 cache 525 are virtual address tags (VAT) storing virtual address bits. VIVT cache 520 has several advantages over the other two caches. First, no TLB translation is needed to access L1 520, which saves energy for an L1 hit which by far is the most common access type in a memory hierarchy. Secondly, it can be accessed faster than PIPT cache 500, since its index bits 524 do not require the TLB lookup. Lastly, it has no size restrictions.

However, there are new problems imposed by a VIVT cache that need to be addressed. First, that same physical cache line may be referenced to using different virtual addresses. This causes a synonym problem for VIVT caches if it stores several virtual copies for the same physical cache line. This problem is normally dealt with by imposing mechanisms that guarantee that two or more synonym cache lines cannot reside the in the VIVT cache at the same time. Secondly, the same virtual address used by different processes may refer to different physical cache lines. This is referred to as the aliasing problem. The aliasing problem can be dealt with if the virtual address 522 generated by the CPU core 521 includes some process identifier, often referred to as an address space identifier. A third problem is introduced when several private caches exist in a multicore system, such as the one depicted in FIG. 1. L2 and higher level caches are often of PIPT type and addressed using physical addresses. Thus, any communication between these L2 and the L1 caches typically carry physical addresses. Examples of such communication include, but are not limited to, coherence requests generated by a coherence protocol and so-called back-invalidate requests caused to some inclusion property imposed between the L1 caches and the L2 and higher level caches. While PIPT caches and VIPT caches can both perform cache lookup based on physical addresses and find the cache line targeted by such external requests, a VIVT cache cannot be accessed using a physical address.

FIG. 4 is a block diagram illustrating an example implementation of a tag-less cache. As background information, FIG. 4 depicts a possible implementation of a tag-less cache. Such caches may rely on location information LI (sometimes referred to as cache line pointers (CP)) corresponding to a requested cache line of a matching cache table entry CTE (sometimes referred to as a region location) to indicate in which cache, as well as in which location within that cache, the requested cache line resides. This will cause some systems to perform a direct cache lookup at the appropriate cache. For example, in the system (which may be a node in a multiprocessor system) shown in FIG. 4, the location information can distinguish between L1 CACHE and L2 CACHE. It may also be able to distinguish between other caches present in the rest of the multiprocessor system, not shown in FIG. 4. FIG. 4 shows a tag-less node that may be connected to other nodes in a multiprocessor system, with a two-level cache hierarchy of set-associative caches and a CPU (which may contain one or many traditional caches, here depicted L0), where CPU 401 generates addresses (ADDR) 402. FIG. 4 also shows a two-level cache location buffer (CLB) (sometimes also referred to as a metadata cache—MD cache) hierarchy of set-associative CLBs, where first-level CLB CLB1 410 and second-level CLB CLB2 420 are indexed with ADDR. As used in the present disclosure, the term "CLB1" may refer to a first-level CLB and the term "CLB2" may refer to a second-level CLB. Each entry in CLB1 410 includes at least an address tag (AT) 411 and a cache location table (CLT) 412. It may store additional information, such as region information (RI) 413. The CLT 412 stores location information (LI) for the cache lines of a corresponding region (also referred to as a micropage). FIG. 4 shows four LI per region as an example. Empirical studies by the inventors shown that 8 to 16 LI per region (i.e., 8 to 16 data units (cache lines) per region) to be cost-effective and efficient. The location information encodes the location where the corresponding cache line can be found within a multiprocessor system. The location information may, for example, contain the identity of a cache where the data unit can be found. The location information may also contain a location within that cache where the data unit can be found. Alternatively, the location information may contain the identity of a node where the data unit can be found or contain some symbol that provides information about its location, for example the symbol "MEM" indicates that the data unit can be found in memory. In at least some cases, the symbol "don't know" may indicate that the location of the corresponding data unit is not recorded in the CLT 412 corresponding to the region.

MUX 416 selects the CLT with an AT 411 matching a TAG portion of the ADDR 402 and a MUX 415 selects the LI 414 corresponding to the requested cache line based on the L-OFFSET portion of ADDR 402. If the cache identity stored in the selected LI corresponds to the L2 cache 440, an address 417 for accessing the requested data unit in L2 CACHE 440 is formed using an INDEX portion of the address 402 and a portion of the location information 414. In the example of a set-associative L2 CACHE 440, that portion contains information corresponding to the associative way where the requested data unit is stored. If the cache identity stored in the selected LI corresponds to the L1 cache 430, an address 418 for accessing the requested data unit in L1 CACHE 430 is formed in a similar way.

In the example illustrated in FIG. 4, each entry in the L1 cache 430 and L2 cache 440 to have a backwards pointer (BP), 432 and 442 respectively, associated with its cache line. (DATA), 431 and 441 respectively. In this example, the BP pointers point to their respective associated CTE in CLB2 420. Each CTE in CLB2 420 contains an address tag (AT) 421, a CLT 422 and a CLB1 Pointer (CIP) 423. If the CLB2 entry has a corresponding CLT residing the CLB1 410, its CIP will point to that entry. In that case CLB1 410 will contain the up-to-date information for this region. In that case, the CLE in CLB1 is said to be the active CLB entry, while the CLB entry for the region in CLB2 420 contains a passive entry. CLB2 420 may be required to contain a passive entry for a region if CLB1 410 contains an active entry for the region.

When no matching CTE can be found in CLB1 410, a corresponding CTE may be looked for in CLB2 420 and copied to CLB1, while an old entry in CLB1 is copied to CLB2 420, this is referred to as spill and fill or simply spill/fill (SPILL and FILL in FIG. 4). A spill is also for example performed when a traditional inclusive cache evicts a data unit to the next level to make space for a new data unit, which may be brought in (fill) from the next cache level. A similar spill/fill activity will be performed between the different CLB levels, where CLB entries are moved between the CLB levels, since the CLB levels forms an inclusive hierarchy. A directory DIR may be at the root of the CLB hierarchy and spill/fill with the highest level CLBs.

It is possible to initiate access to the requested data unit in parallel with the spill/fill activity.

The contents of the CLBs of a multi-level CLB implementation may be kept consistent with the locations of the data units of the multi-level cache system they manage. A data unit that is moved in the cache hierarchy, including but not limited to movements caused by requests for the data unit from the CPU, evictions of the data unit, prefetching activities and coherence activities, cause an update to its corresponding location information in one or many of the CLBs. For example, in FIG. 4, evicting a data unit 441 from cache 440 can involve the steps of following its associated BP 442 pointer to find its corresponding CTE (which in this example is in the CLB2 420) and updating its corresponding location information to point to the data unit's new location (e.g., storing the MEM symbol). And, if the CIP pointer of the corresponding CLB2's CLE is valid, following the CIP to find its corresponding CTE in the CLB1 410 and updating its location information associated with the cache line. The entry in the CLB2 may not be updated if there is a valid CIP pointer. For example, CLTs may be updates such that only active CLTs are updated.

As will be appreciated from the foregoing, using the above-referenced tag-less cache systems, i.e., cache systems where the data unit stored in a cache does not have an address tag associated with it, will result in a number of different types of transactions which will occur when various cache lines located in different storage devices are requested by a CPU 401. The node depicted in FIG. 4 may be a subsystem (or node) of a larger multiprocessor system comprised from several such cache nodes. Keeping the data of the caches in the many nodes coherent requires a cache coherence protocol, for example implementing either snooping or directory-based coherence. The coherence protocol will send coherence requests to the depicted node in FIG. 4 (EXTERNAL REQUESTS). These requests will typically first turn to CLB2 420, which may determine that this cache system does not have the requested cache line (CLB2 miss or a CLB2 hit to an entry with an inactive CIP and the location information of the requested cache line holding the value memory pattern). If so, no further action is needed with respect to the data caches L1 and L2 (known as coherence filtering), but the corresponding LI in the active CLT may nevertheless need to be updated to track a new location associated with the data unit. Otherwise, the CLB2 lookup may provide the requested location information (CLB2 hit and the location information of the requested cache line holding storing the location of the cache line), or it may determine that CLB1 410 stores the associated location information (CLB2 hit and a valid CIP). In the latter case, a lookup in CLB1 410 is needed to determine either the location of the requested cache line or that the cache line does not reside in this cache sub-system. (The corresponding location information in CLB1 contains a memory pattern).

Depending on the nature of the coherence request, for example an invalidation request, a read request, or an exclusive read request, the coherence protocol will perform some operations on the requested data unit and possibly change its state. The corresponding LI in the active CLT may also need to be updated to track a new location associated with the data unit.

Even though the node shown in FIG. 4 consists of two cache levels, someone skilled in the art would understand that nodes can be assembled using other number of levels and may contain more than one CPU. Furthermore, the number of cache levels and the number of CLB levels in a node do not need to be identical.

To summarize the discussion above regarding FIG. 3 and FIG. 5, it will be appreciated by those skilled in the art that contemporary implementations of a cache hierarchy may require many associative lookups to be performed in TLBs as well as at different cache levels before the location of a requested cache line can be determined. Furthermore, each translation entry and cached cache line needs to be accompanied by an address tag and a plurality of these tags need to be compared with a portion of an address at each of these levels. Overall, this implementation may come at a substantial cost in terms of the dynamic energy used for each associative lookup. It also requires substantial overhead in static energy and memory capacity to store the extra tag information that is needed to perform the comparisons. Furthermore, multiprocessors containing several CPUs or several nodes, each with their own private cache hierarchies require additional costly search mechanisms for locating data residing in the private caches as well as the need for costly coherence activities to keep replicated copies of the same data in the private cache coherent.

Accordingly, it may be desirable to provide systems and methods that avoid the aforementioned problems and drawbacks associated with TLB lookups for data and instructions. For example, it may be advantageous if data and instructions in their lower-level caches (e.g., the L1 caches) could be accessed using virtual addresses instead of physical addresses. If the address tags of data and instruction lower-level caches contains virtual address tags, further implementation efficiency could be achieved. That way the extra latency and energy consumption imposed by the TLB could be completely avoided for the L1 hits, which are by far the most common type of memory access to the memory hierarchy. In order to achieve this, a solution for how physically tagged L2 and higher level caches can interact with virtually tagged L1 caches is needed.

SUMMARY

According to at least one example embodiment of the inventive concepts, cache lines are stored in private caches in nodes of a multiprocessor system, each node containing at least one processor (CPU), at least one cache private to the node. According to one embodiment, a cache private to the node is accessible by a core in the node using a virtual address, and is referred to as the virtual cache. Another cache in the system is accessible by the core, as well as requests originating from other cores in the system, using physical addresses, and is referred to as the physical cache. In order to address translation problems typically present for such virtually accessed caches each cache line location in the virtual cache stores a cache line pointer (CP) associated with its cache line, where the pointer identifies a cache line location in the physical cache. Likewise, each cache line location in the physical cache stores a cache line pointer (CP) associated with its cache line. A cache line location in the physical cache pointed to by a cache line pointer of a cache line location in the virtual cache will have its cache line pointer pointing to the cache line location in the virtual cache.

According to at least some example embodiments of the inventive concepts, a multiprocessor system includes a plurality of nodes and at least one memory, each node containing at least one processor; a first cache configured to store a plurality of first cache lines, the first cache being private to at least one node from among the plurality of nodes; and a second cache configured to store a plurality of second cache lines, the second cache being at a higher level than the first cache, wherein at least one of the first cache lines includes a first associated pointer pointing to a location of one of the second cache lines, and wherein at least one of the second cache lines includes a second associated pointer pointing to a location of one of the first cache lines.

According to at least some example embodiments of the inventive concepts, a data management method for a system, the system including at least one node, the at least one node including a processor to which a first cache, a second cache, and a memory are allocated, the first cache storing a plurality of first cache lines and being private to the at least one node, and the second cache storing a plurality of second cache lines and being at a higher level than the first cache, includes storing a first associated pointer pointing to a location of one of the second cache lines, in one of the first cache lines; and storing a second associated pointer pointing to a location of the first cache lines stored the first associated pointer in the second cache lines pointed by the first associated pointer.

According to at least some example embodiments of the inventive concepts, a non-transitory, computer-readable storage medium comprising computer-executable instructions that, when executed by at least one processor to which a virtually tagged cache, a physically tagged cache and a memory are allocated, cause the at least one processor to perform operations including, storing a first associated pointer pointing to a location of one of a plurality of second cache lines stored in the physically tagged cache, in one of first cache lines stored in the virtually tagged cache; and storing a second associated pointer pointing to a location of one of the first cache lines, in one of the second cache lines.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
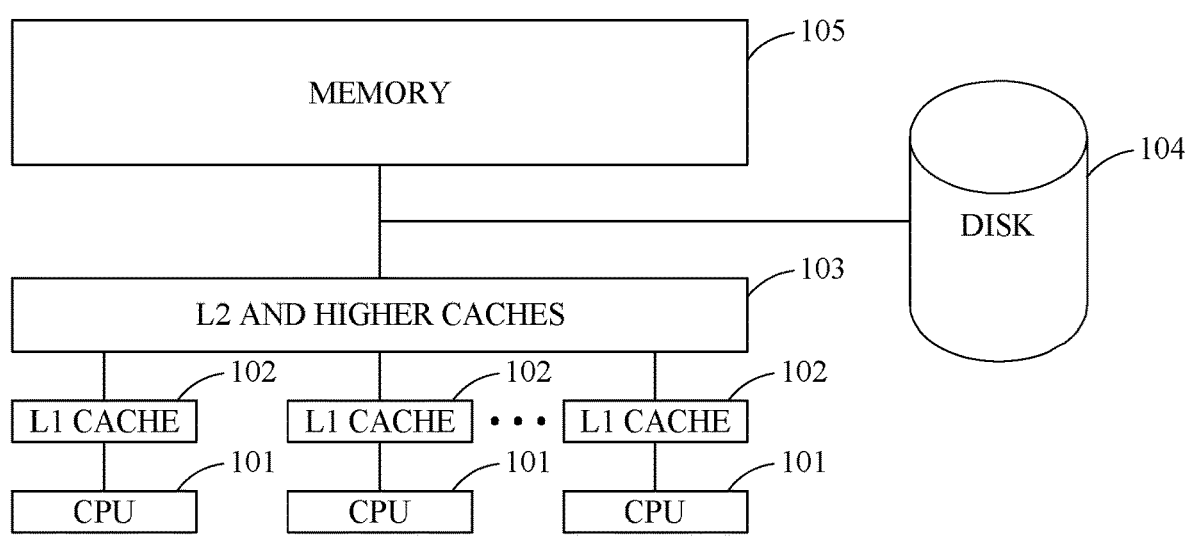
FIG. 1 is a block diagram illustrating a portion of a computer system.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

The general problem in interfacing communication and interaction between virtually-tagged and physically-tagged caches (hereafter referred simply as virtual caches and physical caches) is that they do not speak the same "language" and, instead, the virtual caches and physical caches call the same cache line by its virtual name or by its physical name, respectively. Performing a full translation between the virtual and physical address spaces each time there is interaction between the virtual and physical caches requires new complicated and costly hardware.

Figure 5:
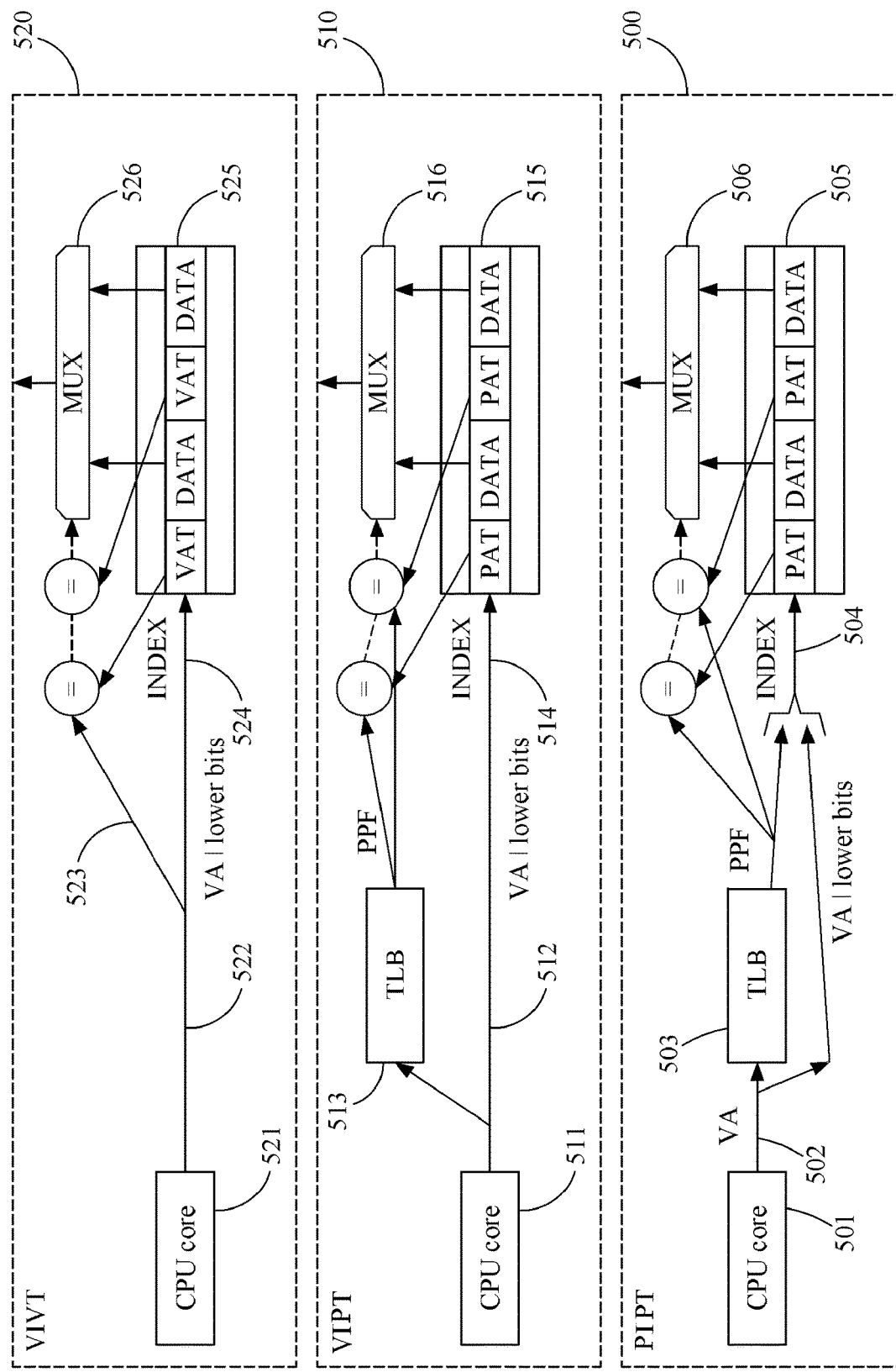
FIG. 5 is a block diagram illustrating three options for implementing a cache.
Figure 6:
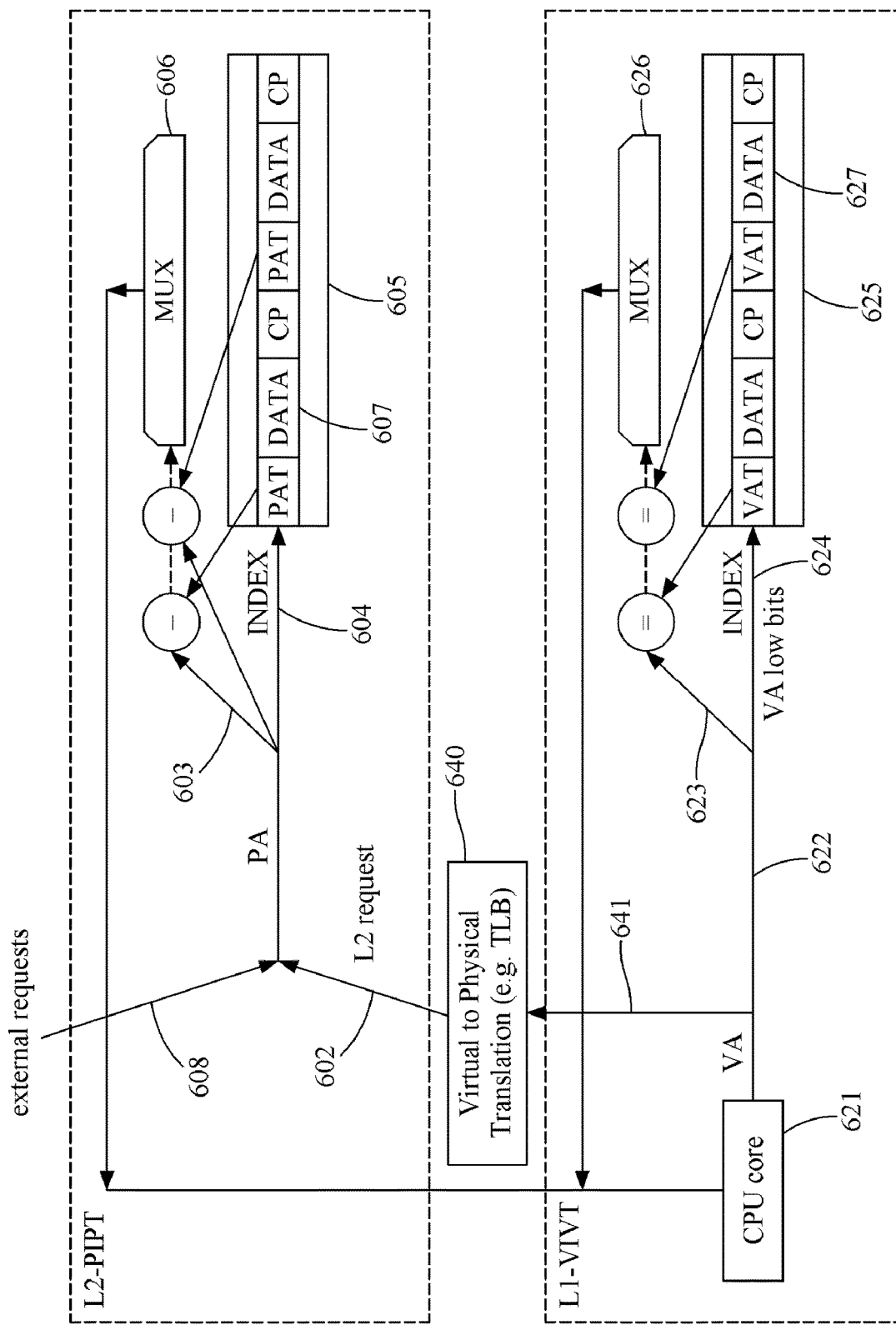
FIG. 6 is a block diagram for explaining an implementation of a two-level cache hierarchy, where the first level is a virtually indexed virtually tagged cache and the second level is a physically indexed, physically tagged cache (PIPT), according to at least some example embodiments of the inventive concepts.

FIG. 6 is a block diagram for explaining an implementation of a two-level cache hierarchy, where the first level is a virtually indexed virtually tagged cache and the second level is a physically indexed, physically tagged (PIPT) cache, according to at least some example embodiments of the inventive concepts. According to at least some example embodiments of the inventive concepts, the example illustrated in FIG. 6 provides a simple and fast mechanism to support interaction between a virtual and a physical cache. It should be noted that both the cache lines location 627 in the L1-VIVT cache 625 and the cache lines location 607 in the L2-PIPT cache 605 have been extended with a new cache line Pointer (CP) field when they are compared with the standard virtually indexed, virtually tagged (VIVT) and physically indexed, physically tagged (PIPT) caches depicted in FIG. 5.

At the bottom of the FIG. 6 is a virtual cache 625 that can provide fast and energy-efficient accesses using the virtual address 622 produced by the CPU core 621, since both its index bits 624 and its VAT comparison bits 623 consist of virtual address bits. It can quickly determine if the requested cache line resides in its cache 625 and, if so, then the requested data is returned to the CPU core 621.

If it is determined that the requested cache line does not exist in the virtual cache 625, a victim cache line location is selected. In this example, we assume that the rightmost cache line location 627 of the selected set (determined by the index bits 624) in the L1 cache is selected and its cache line evicted. At the same time, the virtual address of the request is sent to a virtual-to-physical address translator 640, e.g., a translation look-aside buffer (TLB), to produce a physical address L2 request 602 that can be used to search for the requested cache line in the L2 cache (and higher-level caches). According to at least some example embodiments of the inventive concepts, the virtual-to-physical address translator 640 may be a virtual-to-physical address translator (e.g., TLB) that is allocated to the CPU core 621.

The L2 request 602 also carries the victim cache line location, i.e., the rightmost cache line location 627 of the selected L1 cache. The location information can be encoded using the cache index and cache way of the victim cache line location. However, assuming that some address bits used as index bits 624 for the L1 cache will not change when the address is translated between virtual and physical addresses, the location information only need to contain the part of the index that cannot be determined from a physical address, i.e. none of the 12 lowest address bits need to be included if the page size of the system is 4 Kbyte. If the L1 cache 625 is direct mapped (i.e., each set only has one cache line location), the victim cache line location carried by the L2 request 602 only need to identify the selected set and does not need to identify any way.

A lookup in the L2 cache is performed by selecting index bits 604 from the physical address of the L2 request 602 to select the set where the requested cache line should reside (if it is there). In this example, the comparison between the PATs of the selected L2 cache and the address bits 603 determines that the requested cache line resides in the leftmost cache line location 607 of that set. This location is referred to herein as the "hit cache line location."

Now several steps will be taken: (1) the CP of the victim cache line location will be stored in the CP of the hit cache line location in cache 605; (2) the cache line will be returned by the physical cache 605 to the CPU core 621 and to the L1 virtual cache 625 and written into the victim cache line location in the L1 virtual cache 625; and, (3) the CP of the hit cache line location will be stored in the CP of the victim cache line location. In summary, after the requested cache line has been filled from L2 to L1, the cache line location in L2 providing the data will store a CP pointer to the cache line location in L1 where the cache line is installed (e.g., stored), and the cache line location in L1 where the cache line is installed (e.g., stored) will store a CP pointer to the cache line location in L2 that provided the data. That way, the corresponding cache line locations in L1 and L2 will store cross-wise CP pointers pointing to each other.

According to at least one example embodiment of the inventive concepts, inclusion is enforced between the virtual L1 cache 625 and the physical L2 cache 605 in FIG. 6. This implies that if a cache line resides in a location in L1, the cache line must have a corresponding location residing in L2. According to at least one example embodiment of the inventive concepts, the L1 cache is of a write-through type (e.g., a write-through cache), i.e., when a cache line in L1 is being written to, the corresponding cache line in L2 (identified by the written cache line's CP in cache L1) is also written to. According to at least one example embodiment of the inventive concepts, the L1 cache is of write-invalidate type (e.g., a write-invalidate cache), i.e., a cache line residing in L1 (and subsequently also in L2) is invalidated on a write performed to the cache line and the corresponding cache line in L2 instead updates. For both these cache types, cache lines in L1 will never store dirty data that differs from a corresponding cache line in L2.

However, according to at least one example embodiment of the inventive concepts, the L1 cache is of write-back type (e.g., a write-back cache), i.e., a cache line in L1 may be modified without modifying its corresponding cache line in L2. The cache line in L1 will thus become dirty. According to at least one example embodiment of the inventive concepts, upon the eviction of a dirty cache line from L1, the corresponding cache line in L2 gets updated. According to at least one example embodiment of the inventive concepts, the CP of the cache line location storing the dirty cache line is used to find the appropriate cache line in L2 to update. According to at least one example embodiment of the inventive concepts, the CP of the corresponding cache line in L2 changes its state to reflect that it is not readable when the CP in its corresponding L1 cache line becomes dirty. According to at least one example embodiment of the inventive concepts, the CP of the corresponding cache line in L2 has its CP updated when it's corresponding clean (i.e., not dirty) cache line is evicted from L1.

The L2_PIPT cache in FIG. 6 can receive an external request 608, e.g., a read request or an invalidation request produced by a cache coherence protocol. This implies that a cache line that resides in the L2-PIPT and/or the L1-VIVT will need to be read or invalidated. According to at least one example embodiment of the inventive concepts, the external request 608 carries a physical address, which can be used to perform a lookup on the L2-PIPT cache, but not used directly to perform a lookup in L1-VIVT. Instead, the corresponding cache line is first searched in L2-PIPT, where it for example is determined that the requested cache line is in a leftmost cache line location 607 of a selected set. The CP of the leftmost cache line location 607 can then be used to determine the location of the cache line in LI-VIVT if the CP contains a valid pointer. According to at least one example embodiment of the inventive concepts, both identified cache line locations are invalidated if the external request 608 is an invalidation request, and at least one of the identified cache line locations is read if the external request 608 is a read request.

According to at least one example embodiment of the inventive concepts, if the CP of the identified cache line location in L2-PIPT can determine that the identified cache line location in L1-VIVT is dirty, the identified cache line location in L1-VIVT will be read as a response to an external read request, else the identified cache line location in L2-PIPT will be read. Someone skilled in the art understands that there are also many other alternative ways to encode and determine that the cache line in L1-VIVT is dirty, including but not limited storing a dedicated cache line state in the selected L2-PIPT cache line location.

According to at least one example embodiment of the inventive concepts, if the CP of the identified cache line location in L2-PIPT can determine that the identified cache line location in L1-VIVT is writable, the identified cache line location in L1-VIVT will be read as a response to an external read request, else the identified cache line location in L2-PIPT will be read. Someone skilled in the art understands that there are many alternative ways to encode and determine the cache line in L1-VIVT is writable, including but not limited storing a dedicated cache line state in the selected L2-PIPT cache line location.

Those skilled in the art understands that there are many possible alternative configurations of L1 for which the above translation scheme explained for FIG. 6 would be beneficial. L1 could for example be a virtually indexed, physically tagged cache (VIPT) cache 510 with a size/associativity such that some of its index bits would be translated on a translation from a virtual to physical address. Such configuration would also benefit from the mechanisms explained above, since it cannot be determined from a physical address which index to select in the VIPT cache. Someone skilled in the art understands that the mechanism explained for FIG. 6 are broadly applicable to any lower-level cache for which the cache line location of a cache line cannot be determined by the address (physical, virtual or other) provided by some kind of access request targeting the cache.

Below are some steps taken in response to some requests in accordance with at least some example embodiments of the inventive concepts.

According to at least some example embodiments of the inventive concepts, in response to a request to read request for data identified by a virtual address VA1 that misses in L1-VIVT and hits in L2-PIPT, the following steps will be taken:
1) VA1 is used to select a set within L1 cache 625.
2) The VATs of that selected set are compared with some of VA1's bits 623.
3) The comparison determines that the data does not exist in the VIVT cache 625.
4) A victim cache line location 627 is selected.
5) The previous cache line stored at that location is evicted.
6) A translation from VA1 to PA1 is performed.
7) PA1 is used to access L2-PIPT 605.
8) It is determined that the requested data resides in a hit cache line location 607.
9) The CP of the hit cache line location 607 is updated to hold a pointer to the victim cache line location 627.
10) The requested data is returned to the CPU core 621.
11) The CP of the victim cache line location 627 is updated to hold a pointer to the hit cache line location 607.

According to at least some example embodiments of the inventive concepts, in response to a request to read request for data identified by a virtual address VA1 that misses in L1-VIVT and misses in L2-PIPT, some additional steps will be taken.

Steps 1-7 will be performed as outlined above.
At step 8 it will be determined that the requested data does not exist in L2-PIPT and additional steps will be included to send a request to the "higher-level caches" and select an L2-victim location. Once the data has been from returned from the "higher level caches", the L2-victim location will assume the sole of the hit cache location and steps 9-11 will be continued.

According to at least some example embodiments of the inventive concepts, in response to an eviction of a dirty victimized cache line from a victim location in the VIVT-L1, the following steps will be taken.
1) The target location in L2 of the dirty cache line is identified to be the location pointed to by the CP of the victimized cache line.
2) The dirty cache line is sent to the target location in L2.
3) The CP of the target location is changed to reflect the fact that L1 cache no longer contains the dirty victimized cache line.

According to at least some example embodiments of the inventive concepts, when a coherent read request for a physical address PA1 is received on the external request interface 608, the following steps are taken:
1) It is determined whether a cache line corresponding to PA1 resides in the L2 cache 605 and a cache line location is identified to hold the cache line.
2) It is determined that the cache line stored in location 607 cannot be used to reply to the request. This may be, for example, because the CP of location 607 encodes that the corresponding cache line location in L1 625 either has a dirty cache line, stores a writeable cache line (that may become dirty this very cycle), or some other reason the cache line in the L2 cache 605 cannot be used for some coherence reasons.
3) The cache line location in L1 pointed to by the CP is read and its data returned as a response to the coherence request.
4) The L1 cache line is downgraded to no longer be writeable.
5) The CP of the cache line location 607 in L2 cache 605 is changed to reflect that the cache line in L1 cache 625 is no longer writable or dirty.

According to at least some example embodiments of the inventive concepts, in response to receipt, on the external request interface 608, of a coherent invalidation request for a physical address PA1, the following steps are taken:
1) It is determined whether a cache line corresponding to PA1 resides in the L2 cache 605 and a cache line location 607 is identified to hold the cache line.
2) The cache line stored in the cache line location 607 is invalidated.
3) The CP of the cache line location 607 is examined to determine if there is a corresponding cache line stored in L1 (e.g., determine if the CP of cache line location 607 is valid).
4) The cache line location in L1 pointed to by the CP is invalidated and marked as not readable or writeable to CPU core 621.
5) An acknowledge message may be sent as a response to the coherence request.

Figure 7:
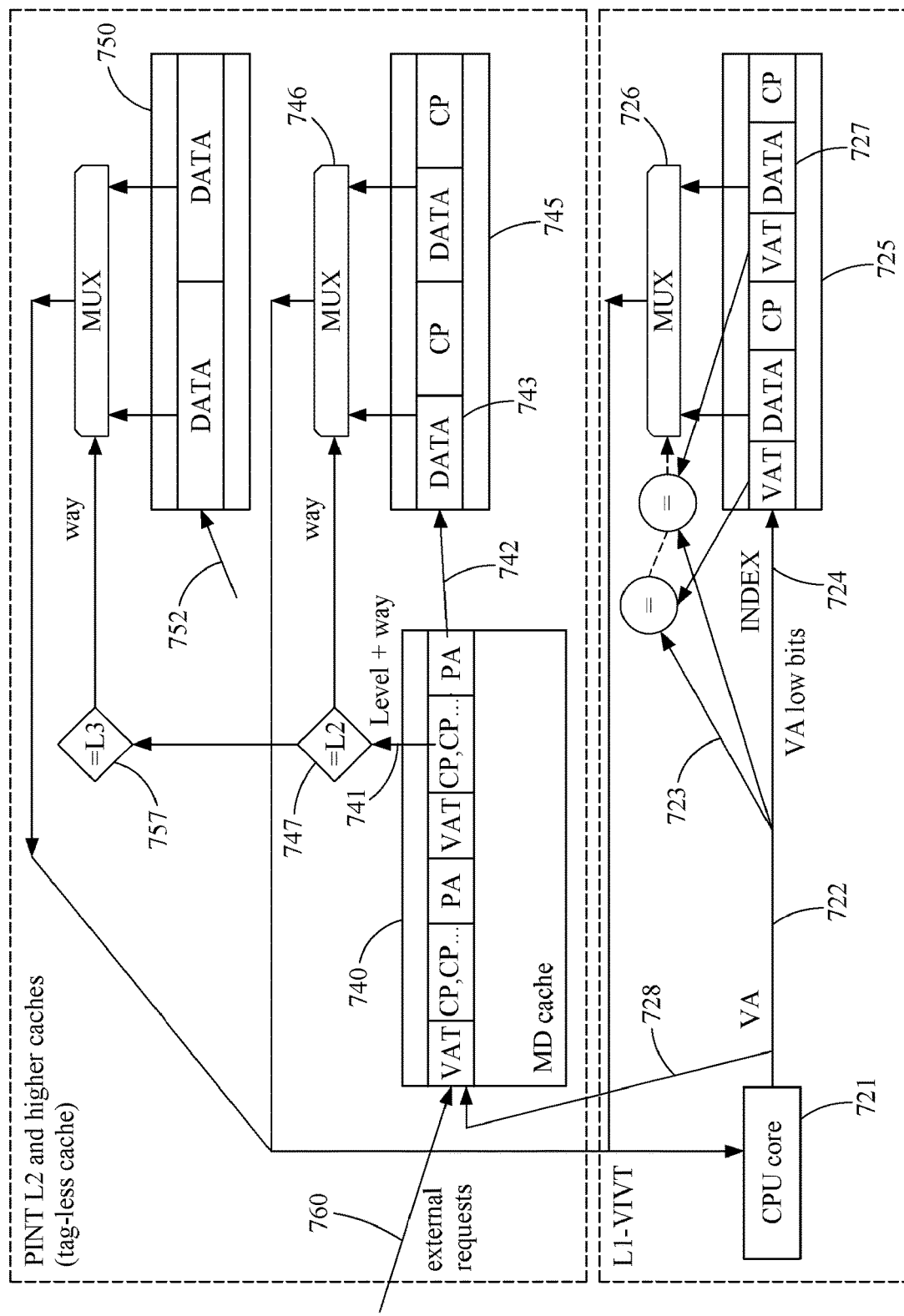
FIG. 7 is a block diagram for explaining an implementation of a three-level cache hierarchy, where the first level is a virtually indexed virtually tagged VIVT cache and the second and third levels are tag-less physically indexed no tag PINT caches, according to at least some example embodiments of the inventive concepts.

FIG. 7 is a block diagram for explaining an implementation of a three-level cache hierarchy, where the first level is a virtually indexed virtually tagged VIVT cache and the second and third levels are tag-less physically indexed no tag PINT caches, according to at least some example embodiments of the inventive concepts. FIG. 7 shows a system built partly from so-called tag-less caches. Tag-less caches store no address tag associated with their cache line locations. Instead, a special metadata cache hierarchy tracks the location of the system's cache lines by storing cache line pointers. A detailed example of a tag-less cache, according to at least some example embodiments of the inventive concepts, can be found in FIG. 4. FIG. 7 only shows the lowest-level metadata cache (MD cache) 740. The MD cache 740 is organized similarly to a regular cache, e.g., any of the cache configurations in FIG. 5 may be used for one or more example embodiments of the inventive concepts. It may be a set-associative, skewed-associative, fully associative or of any other common cache structure. When presented with an address (e.g., VA 722 as shown in FIG. 7) it will determine if metadata corresponding to the address is contained in its structure 740. According to at least one example embodiment of the inventive concepts, the metadata of the MD cache is organized into regions, where each region has an address tag (VAT in FIG. 7) identifying a region consisting of several adjacent cache lines. A region may for example consist of 16 cache lines, but any number of cache line may be possible. On a VAT match, a region location is identified by the associative lookup in the MD cache. The region information stored in the identified region location contains information associated with its corresponding cache lines. For example, it may store a cache line pointer (CP in the Figure) for each of its corresponding cache lines. The CPs may for example consist of information about the CacheID (e.g., cache level) and associative way within the cache where the each corresponding cache line can be found. It may also store a partial index to be used for a lookup in a corresponding cache. The metadata location may also store information that is applicable for all its associated cache lines. It may for example store physical address information (PA in the MD cache of FIG. 7). Other region-wide information stored in a region may include permission bits and some partial index information applicable to all cache lines of the region.

A cache line request 728 may for example performs a lookup in the MD cache and determines its corresponding CP (741). This CP information may be sufficient for finding the corresponding cache line in a cache line location in either L2 cache 745 or L3 cache 750. If these caches are physically indexed, the PA information from the identified region location can be used to form the index information 742 or 752.

FIG. 7 shows a logical picture of how the corresponding cache line location is found in L2 cache 745 and L3 cache 750. First, the cacheID information of CP is compared with "L2" in 747. If there is a match, the way of the CP is used to select the cache line location in L2. If there instead is a match for cacheID="L3" in 757, the cache line location corresponding to the way information of the CP is instead used to find the corresponding cache line. Those skilled in the art would understand that knowing the cacheID, way information and index information of for a requested cache line enables a direct access to that cache without the need for the 747 comparison or the 746 mux, which are only shown as a logic example. Such a person would also appreciate that the L2 and L3 caches can be implemented using plain memory arrays, such as SRAM, DRAM, NVM or any other memory technology. Since the L2 and L3 caches in FIG. 7 contain no tags and are physically addressed, we refer to them as physically indexed, no tags (PINT).

The "PINT L2 and higher caches" of FIG. 7 stores CP information associated with each of its cache line locations. Similarly to the system shown in FIG. 6, the corresponding cache lines locations in L1 725 and L2 745 will store cross-wise CP pointers pointing to each other. Receiving an external request 760 will cause the corresponding cache line location in L2 to be identified by a MD cache 740 lookup, identifying the corresponding CP and PA. The steps described for FIG. 6 describing initialization of the cross-wise CP pointers and the steps of replying to external requests and evicting cache lines from an L1 cache are also applicable to how the L2 cache 745 and L1 cache 725 interact for implementing such activities. According to at least one example embodiment of the inventive concepts, the partial index information stored as part of the CPs of the L2 cache 605, pointing to the corresponding cache line in L1-VIVT 625, can instead be stored as part of the corresponding region location in MD cache 740 in the system depicted in FIG. 7. According to at least one example embodiment of the inventive concepts, if it can be determined that all the cache lines of a region always have the same partial index information for indexing into the L1-VIVT cache 725, the partial region information can be stored as a region-wide information in the corresponding region location, which is more efficient than storing that index information for each cache line separately. According to at least one example embodiment of the inventive concepts, the L1-VIVT cache 725 is direct mapped and no way information needs to be stored in the CPs of L2 745. For that configuration it may be sufficient to implement CP in L2 745 as a single valid bit, indicating if the corresponding cache line exist in L1 cache 725. In that configuration, region-wide index information stored in the MD cache 740 can be used to find the corresponding cache line location in the L1 cache 725.

Figure 8:
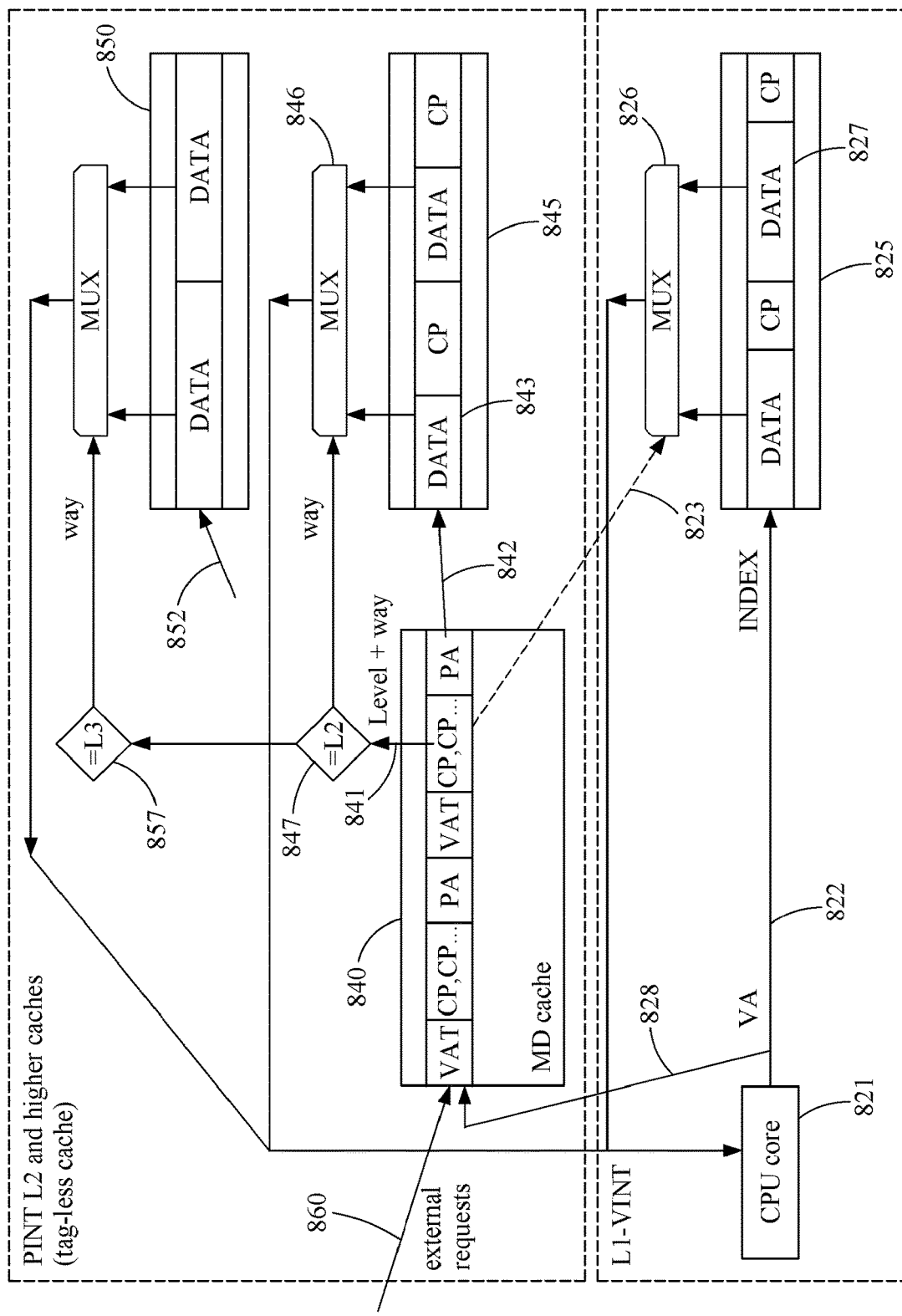
FIG. 8 is a block diagram for explaining an implementation of a three-level cache hierarchy, where the first level is a tag-less virtually indexed no tag VINT cache and the second and third levels are tag-less physically indexed no tag PINT caches, according to at least some example embodiments of the inventive concepts.

FIG. 8 is a block diagram for explaining an implementation of a three-level cache hierarchy, where the first level is a tag-less virtually indexed no tag VINT cache and the second and third levels are tag-less physically indexed no tag PINT caches, according to at least some example embodiments of the inventive concepts. FIG. 8 is similar to FIG. 7 in that it depicts the same "PINT L2 and higher caches". However, the L1 cache in 825 is a tag-less cache which is virtually indexed, no tags (VINT). The CP of MD cache 840 has here been extended to store location information 823 for the L1 cache 825. Subsequently, no VAT tags are included in L1 cache 825. Instead, the extended location information 823 of MD cache 840 is used to select a corresponding cache line of the L1-VINT. According to at least one example embodiment of the inventive concepts, the LI-VINT is direct mapped, which is why the location information 823 for the L1 cache can be limited to a single bit.

According to at least one example embodiment of the inventive concepts, the MD caches of FIGS. 7 and 8 are accessed using virtual addresses. In that case, a virtual to physical translation is needed along the path of the requests 728 and 828 from the L1-VIVT cache.

According to at least one example embodiment of the inventive concepts, the MD caches of FIGS. 7 and 8 are accessed using virtual addresses. In that case, a physical to virtual translation is needed along the path of the external requests 760 and 860.

Figure 4:
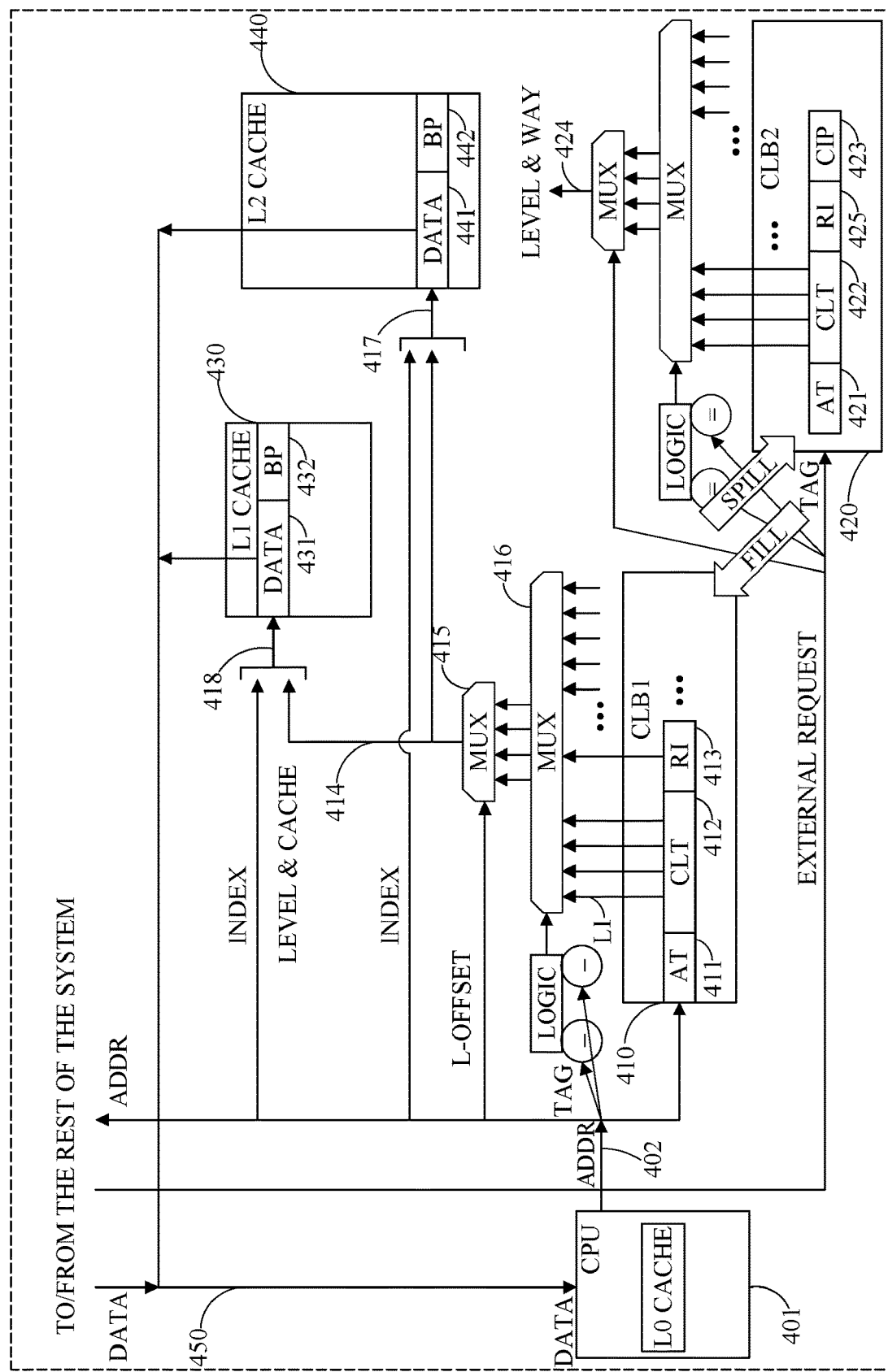
FIG. 4 is a block diagram illustrating an example implementation of a tag-less cache.

According to at least one example embodiment of the inventive concepts, the MD caches of FIGS. 7 and 8 are accessed using virtual addresses from the L1-VIVT cache along the 728 and 828 paths and external requests 760 and 860 carry information that identifies the region location within MD cache 740 and 840 which is associated with the requested cache line. According to at least one example embodiment of the inventive concepts, a structure similar to CLB2 420 of FIG. 4 is used to translate a physical address carried by an EXTERNAL REQUEST into the CLB1 pointer (CIP 423) that identifies Cache Location Entry CLE (also referred to as a region location) within CLB1 (corresponding to the MD cache 740 and 840.

In order to overcome some of the artefacts of direct mapped VIVT caches or VIVT caches with low associativity, especially in the light of possible usage of SMT cores, L1 could be indexed partially scrambled index. Its index [15-12] is composed from an XOR function between some address bits and some ASID bits. That way, running two identical programs simultaneously on the SMT threads (e.g., SPEC rate) is less likely to thrash the cache. Also, two threads from the same process are less likely to thrash each other, even if their parallel runtime system allocates private stack/heap with power-of-two alignment (which was the case for some early multithreaded runtime systems). There are many options for scrambled index function to use. It is likely to be an XOR function between some ASID bits, some higher address bits and some lower address bits, e.g., INDEX[15-12]=VA[15-12] XOR VA{21,22,25,27} XOR ASID[3-0].

Using such scrambled index bits prompts the usage of 4 extra L1 VAT tag bits for cache 725, since there is no longer a 1:1 mapping between INDEX[15-12] and VA[15-12].

The new field SI(4)—(Scrambled Index) in MD cache may store scrambled INDEX[15-12] for each region to allow for external requests to access data in L1.

The steps described in conjunction with FIG. 6 can be performed in various orders and some steps can be performed in parallel or sequentially. These method embodiments, the system embodiments described above, and other embodiments may provide various beneficial results. For example, detailed simulation studies that have been performed in accordance with one or more example embodiments of the inventive concepts have shown that cache implementations associated with one or more example embodiments of the inventive concepts can save substantial energy compared with conventional cache systems and can also result in caches with substantially shorter access time.

Though, for the purpose of clarity, most descriptions herein generally describe techniques for how a cache line is located and returned to a requesting CPU, it will be apparent to those skilled in the art that there are various ways in which a requested word contained within the cache line can be selected and returned to the CPU.

For clarity, most descriptions herein describing the handling of data of cache hierarchies describe exclusive cache hierarchies. Those skilled in the art would understand that one or more example embodiments of the inventive concepts can be extended to also cover inclusive memory hierarchies and non-exclusive memory hierarchies.

Figure 2:
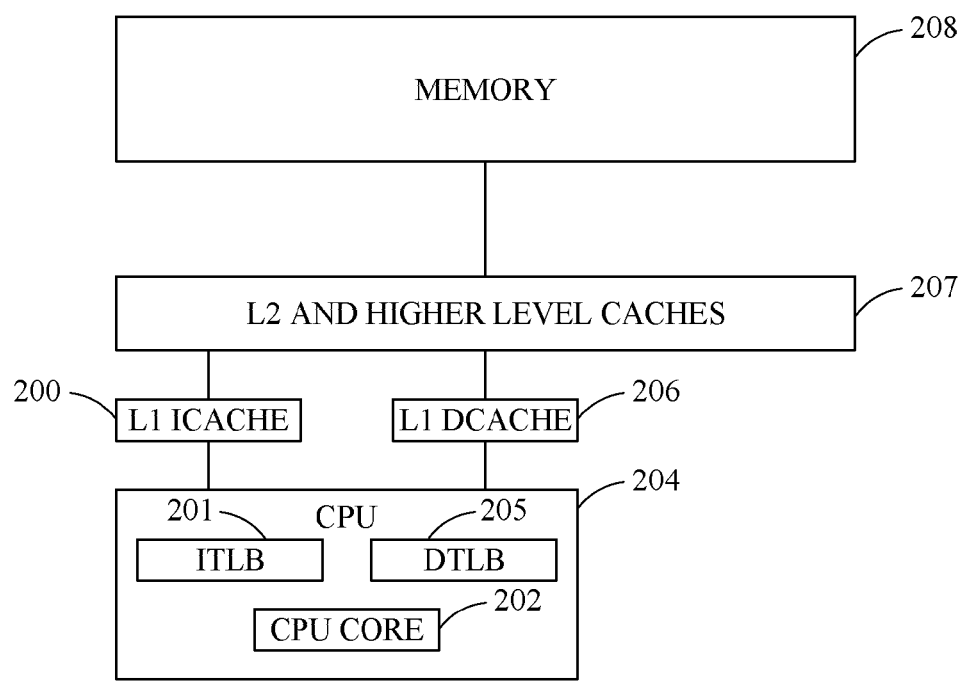
FIG. 2 is a block diagram for explaining an example cache hierarchy of a computer system.
Figure 3:
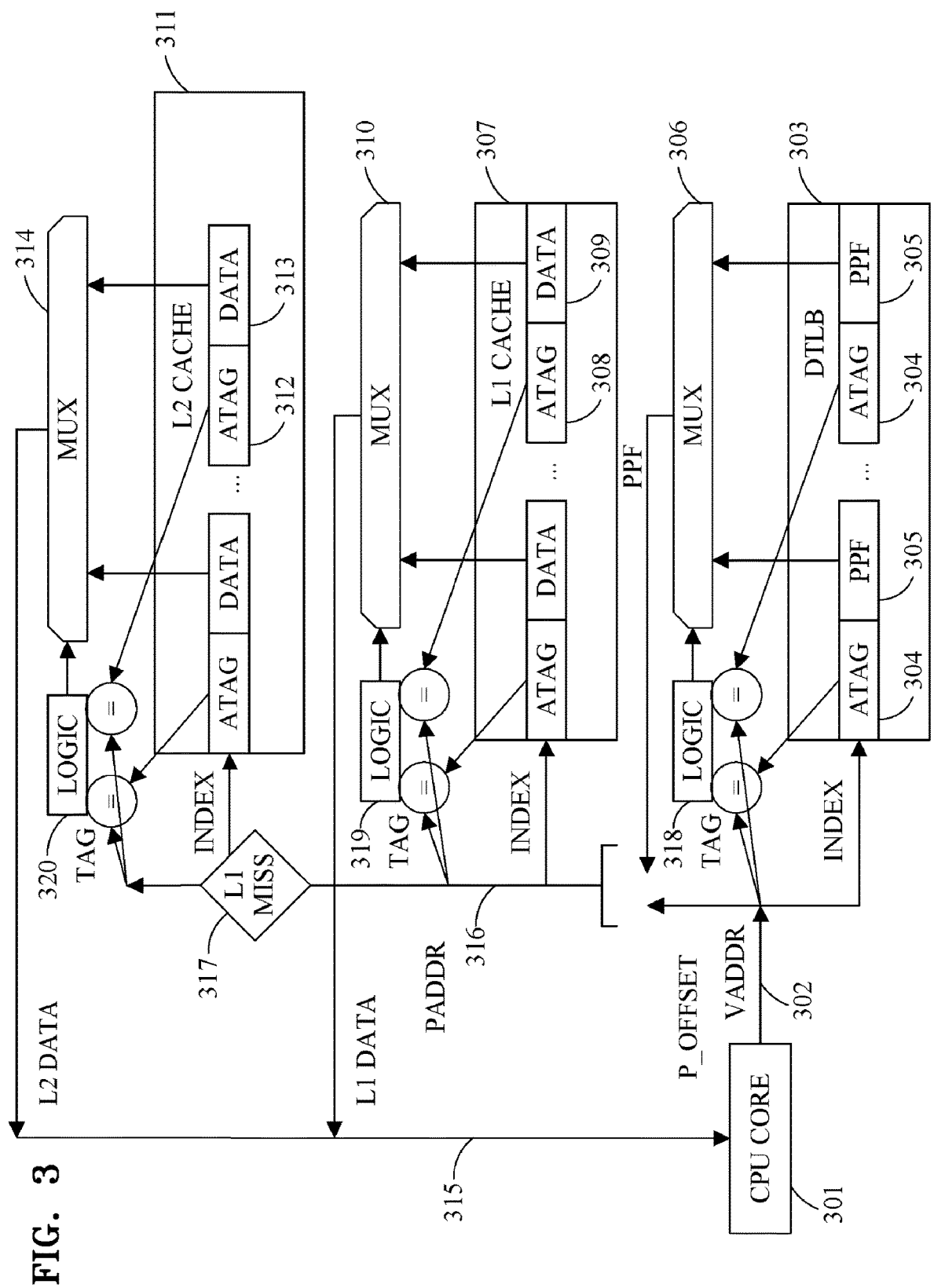
FIG. 3 is a block diagram for explaining a conventional implementation of a two-level cache hierarchy including a set-associative caches and a set-associative data translation look-aside buffer (TLB).

Although one or more of the example embodiments of the inventive concepts described above are useful in association with both uni-processor systems and multi-processor system, such as those illustrated and described above with respect to FIGS. 1 and 2, respectively, one or more of the example embodiments of the inventive concepts are illustrated primarily in association with a uni-processor system. However, those skilled in the art will appreciate that one or more example embodiments of the inventive concepts illustrated in association with a uni-processor system are not limited to such an implementation. For example, though FIGS. 6-8 illustrate a single CPU for the purpose of simplicity, any or all of the portions of computer systems illustrated in FIGS. 6-8 may be a portion of a multi-processor system according to at least some example embodiments of the inventive concepts.

Although described above in the context of certain example computer architectures, caching exists in many other settings within, as well as outside, the example computer systems illustrated in FIGS. 6-8, and those skilled in the art will understand that at least some example embodiments of the inventive concepts described above within the context of computer system may also be applied to such other contexts. An example of such usages is the virtual memory system which caches data from a slow, high-capacity storage, such as a disk or FLASH memories, into a faster and smaller high-capacity memory that could be implemented using dynamic RAM. Other examples of caching in a computer system include, but are not limited to, disk caching, web caching and name caching. The organization and caching mechanisms of such caches may vary from those of the caches discussed above, e.g., variances in the size of a set, their implementation of sets and associativity, etc. Regardless of the implementation of the caching mechanism itself, at least some example embodiments of the inventive concepts are equally applicable for implementing the various caching schemes.

The methods or flow charts provided in the present application may be implemented in a computer program, software, or firmware tangibly embodied in a computer-readable storage medium for execution by a general purpose computer or a processor.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A multiprocessor system for supporting interaction between a virtual cache and a physical cache, the system comprising:
a plurality of nodes and at least one memory, each node containing one or more processors, the one or more processors including a first processor;
a first cache configured to store a plurality of first cache lines, the first cache being private to at least one node from among the plurality of nodes; and
a second cache configured to store a plurality of second cache lines, the second cache being at a higher level than the first cache,
wherein at least one of the first cache lines includes a first associated pointer that points to a location, within the second cache, of one of the second cache lines,
wherein at least one of the second cache lines includes a second associated pointer that points to a location, within the first cache, of one of the first cache lines, and
wherein, in response to a data request of the first processor of the at least one node
resulting in a cache miss in the first cache due to data requested by the data request being included in none of the first cache lines of the first cache, and
resulting in a cache hit in the second cache due to the data being included in at least one of the second cache lines of the second cache
the first processor is configured to
generate a new cache line that holds the data and a pointer, and
store the new cache line in the first cache as one of the plurality of first cache lines,
wherein the pointer of the new cache line points to a location of a second cache line in which the data is stored, from among the plurality of second cache lines.

2. The multiprocessor system according to claim 1, wherein,
the first cache is a virtually tagged cache,
each of the first cache lines includes a virtual tag,
the second cache is a physically tagged cache, and
each of the second cache lines includes a physical tag.

3. The multiprocessor system according to claim 1,
wherein the first cache is a write-through cache such that first data written to a first cache line, from among the plurality of first cache lines of the first cache, is also written to a second cache line, from among the plurality of second cache lines of the second cache, and
wherein the first cache line to which the first data was written includes a pointer that points to a location, within the second cache, of the second cache line to which the first data was written.

4. The multiprocessor system according to claim 1,
wherein the first cache is a write-invalidate cache such that in response to a first cache line, from among the plurality of first cache lines of the first cache, being invalidated, a corresponding second cache line, from among the plurality of second cache lines of the second cache, is also invalidated, and
wherein the first cache line that was invalidated includes a pointer that points to a location, within the second cache, of the corresponding second cache line that was invalidated.

5. The multiprocessor system according to claim 1, wherein the first cache is a write-back cache such that, in response to one of the first cache lines being written to and dirty, a second cache line that is pointed to by a pointer included in the dirty first cache line, from among the plurality of second cache lines, is either
updated upon eviction of the dirty first cache line, or
state-changed to reflect that the dirty first cache line is not readable.

6. A data management method for supporting interaction between a virtual cache and a physical cache for a system, the system including at least one node, the at least one node including a processor to which a first cache, a second cache, and a memory are allocated, the first cache storing a plurality of first cache lines and being private to the at least one node, and the second cache storing a plurality of second cache lines and being at a higher level than the first cache, comprises:
storing in a first cache line from among the plurality of first cache lines a first associated pointer that points to a location, within the second cache, of a second cache line from among the plurality of second cache lines;
storing in the second cache line located at the location to which the first associated pointer points, a second associated pointer that points to a location, within the first cache, of the first cache line in which the first associated pointer is stored;
sending a request for data from the processor to the first cache and the second cache; and
in response to
the requested data resulting in a cache miss in the first cache due to the requested data being included in none of the first cache lines of the first cache, and
the requested data resulting in a cache hit in the second cache due to the requested data being included in at least one of the second cache lines of the second cache,
generating a new cache line that holds the requested data and a pointer, and
storing the new cache line in the first cache as one of the plurality of first cache lines,
wherein the pointer of the new cache line points to a location of a second cache line in which the data is stored.

7. The data management method of claim 6, further comprising:
in response to first data being written to a first cache line, from among the plurality of first cache lines of the first cache, the first data is also written to a second cache line, from among the plurality of second cache lines of the second cache,
wherein the first cache line to which the first data was written includes a pointer that points to a location, within the second cache, of the second cache line to which the first data was written.

8. The data management method of claim 6, further comprising:
in response to a first cache line, from among the plurality of first cache lines of the first cache, being invalidated, a corresponding second cache line, from among the plurality of second cache lines of the second cache, is also invalidated,
wherein the first cache line that was invalidated includes a pointer that points to a location, within the second cache, of the corresponding second cache line that was invalidated.

9. The data management method of claim 6, further comprising:
in response to one of the first cache lines being written to and dirty, changing a state to reflect that the dirty first cache line is not readable,
the state being a state of a second cache line that is pointed to by a pointer included in the dirty first cache line, from among the plurality of second cache lines.

10. The data management method of claim 6, further comprising:
receiving an external request produced by a cache coherence protocol;
performing a lookup in the second cache and selecting one of the second cache lines; and
accessing a first cache line to which a pointer included in the selected second cache line points.

11. The data management method of claim 10, further comprising:
when the external request is an invalidation request, invalidating both the accessed first cache line and the selected second cache line.

12. The data management method of claim 10, further comprising:
when the external request is a read request, reading data stored in at least one of the accessed first cache line and the selected second cache line.

13. The data management method of claim 6, wherein the processor is further allocated a virtual-to-physical address translator, the first cache is virtually tagged cache and the second cache is physically tagged cache, and the method further comprises:
performing a lookup of the first cache based on a virtual address included in a data request generated from the processor;
when the data misses in the first cache, selecting one of the first cache lines as a victim cache line and generating a physical address from the virtual-to-physical address translator based on the data request; and
performing a lookup of the second cache based on the physical address.

14. The data management method of claim 13, wherein the physical address includes a location of the victim cache line.

15. A non-transitory, computer-readable storage medium comprising computer-executable instructions that, when executed by at least one processor to which a virtually tagged cache including a plurality of first cache lines, a physically tagged cache including a plurality of second cache lines, and a memory are allocated, cause the at least one processor to perform a method for supporting interaction between a virtual cache and a physical cache, the method comprising:
- storing in a first cache line from among the plurality of first cache lines a first associated pointer that points to a location, within the second cache, of a second cache line from among the plurality of second cache lines; and
- storing in the second cache line located at the location to which the first associated pointer points, a second associated pointer that points to a location, within the first cache, of the first cache line in which the first associated pointer is stored;
- sending a request for data from the processor to the first cache and the second cache; and
- in response to
  - the requested data resulting in a cache miss in the first cache due to the requested data being included in none of the first cache lines of the first cache, and
  - the requested data resulting in a cache hit in the second cache due to the requested data being included in at least one of the second cache lines of the second cache,
    - generating a new cache line that holds the requested data and a pointer, and
    - storing the new cache line in the first cache as one of the plurality of first cache lines,
- wherein the pointer of the new cache line points to a location of a second cache line in which the data is stored.

16. The non-transitory computer-readable storage medium according to claim 15, wherein the method further includes:
- in response to first data being written to a first cache line, from among the plurality of first cache lines of the first cache, the first data is also written to a second cache line, from among the plurality of second cache lines of the second cache,
- wherein the first cache line to which the first data was written includes a pointer that points to a location, within the second cache, of the second cache line to which the first data was written.

17. The non-transitory computer-readable storage medium according to claim 15, wherein the method further includes:
- in response to a first cache line, from among the plurality of first cache lines of the first cache, being invalidated, a corresponding second cache line, from among the plurality of second cache lines of the second cache, is also invalidated,
- wherein the first cache line that was invalidated includes a pointer that points to a location, within the second cache, of the corresponding second cache line that was invalidated.

18. The non-transitory computer-readable storage medium according to claim 15, wherein the method further includes:
- in response to one of the first cache lines being written to and dirty, changing a state to reflect that the dirty first cache line is not readable,
- the state being a state of a second cache line that is pointed to by a pointer included in the dirty first cache line, from among the plurality of second cache lines.

* * * * *